Patented Jan. 1, 1946

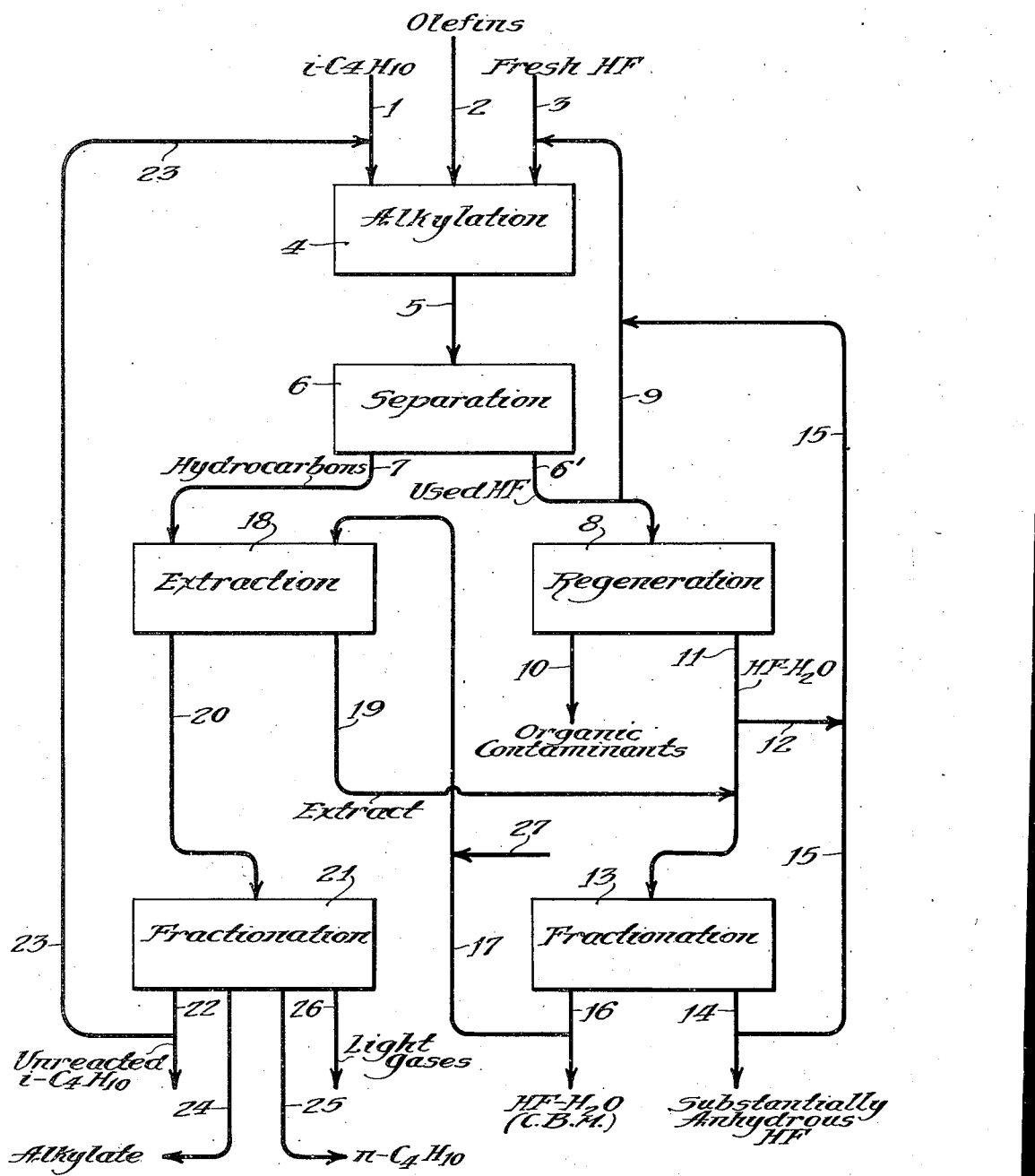

2,392,048

UNITED STATES PATENT OFFICE 2,392,048

RECOVERY OF HYDROGEN FLUORIDE

Louis S. Kassel, Chicago, Ill., assignor to Universal Oil Products Company, Chicago, Ill., a corporation of Delaware Application November 16, 1942, Serial No. 465,696

7 Claims. (Cl. 260—683.4)

This invention relates to a method of recovering free or uncombined hydrogen fluoride from hydrocarbon mixtures containing hydrogen fluoride. It is more particularly concerned with a method of recovering hydrogen fluoride from admixture with substantially saturated hydrocarbons, e. g., the reaction products or unconverted reactants from a hydrogen fluoride alkylation process.

In the catalytic alkylation of isoparaffins with olefins in the presence of a hydrogen fluoride catalyst, i. e., a catalyst whose essential active ingredient is hydrogen fluoride, the catalyst is not consumed to any appreciable extent and may be recovered in substantial amounts as hereinafter described. Although the hydrogen fluoride catalyst becomes contaminated with organic contaminants and water during the process, the used catalyst can be readily regenerated and purified hydrogen fluoride can be recovered and returned to the alkylation zone.

Since hydrogen fluoride is soluble to the extent of approximately 1 or 2% in the substantially saturated alkylation reaction products, it is apparent that a small portion of hydrogen fluoride will be carried out of the reaction zone with the conversion products. In the process of my invention this dissolved hydrogen fluoride is recovered from the hydrocarbon reaction products and recycled to the reaction zone thereby effecting a substantial economy of operation. In previously proposed isoparaffin-olefin alkylation processes employing catalysts such as concentrated sulfuric acid, the dissolved acid or acid bodies in the hydrocarbon reaction products have been removed by treatment with a neutralizing agent such as caustic soda, and the dissolved catalyst was thereby lost from the process.

In one specific embodiment the present invention comprises a process for the recovery of free hydrogen fluoride from admixture with substantially saturated hydrocarbons which comprises extracting a substantial portion of the hydrogen fluoride from said mixture with an aqueous solution of hydrogen fluoride and fractionating the resultant extract to separate substantially anhydrous hydrogen fluoride therefrom.

Although the present method of recovering hydrogen fluoride is particularly applicable to an alkylation process employing hydrogen fluoride as the catalyst, it is equally adaptable to any hydrocarbon conversion process employing a hydrogen fluoride-containing catalyst wherein appreciable amounts of uncombined or free hydrogen fluoride are found in the hydrocarbon reaction products or any portion thereof.

The advantages and various applications of my process will become more apparent in connection with the accompanying drawing which is a schematic flow diagram of a hydrogen fluoride alkylation process wherein isobutane is reacted with olefins in the presence of hydrogen fluoride.

Referring to the drawing, isobutane is introduced through line 1 into alkylation zone 4. This zone may comprise any convenient apparatus or arrangement of apparatus suitable for effecting intimate contact between the hydrocarbon reactants and the hydrogen fluoride catalyst, e. g., a mechanically agitated reaction zone or a so-called "time tank" wherein intimate contacting is obtained by means of baffles, orifices, or jets. The olefinic reactants which may comprise normally gaseous olefins, normally liquid olefins or polymers, are introduced through line 2. The hydrogen fluoride catalyst is introduced through line 3.

The alkylation of isoparaffins with olefins is usually carried out at a temperature of from about 50 to about 150° F. and under sufficient pressure to maintain the catalyst and hydrocarbons in substantially the liquid phase. The time factor may be expressed in terms of "space time" which is defined as the volume of catalyst in the reaction zone divided by the hydrocarbon feed rate in volumes per minute. A space time of from about 5 to about 80 minutes will ordinarily be employed. As is well-known in the alkylation art, it is desirable to maintain a substantial excess of isoparaffins over olefins in the combined feed to the alkylation zone, e. g., from about 2:1 to about 10:1 or higher.

Although commercial "anhydrous" hydrogen fluoride is usually charged to the process, it is possible to have as much as about 10% of water present in the catalyst. Excessive dilution with water is undesirable, however, because of the danger of corrosion and because the alkylating activity of the catalyst diminishes with increasing water content. Minor amounts of promoters such as boron trifluoride may also be present in the hydrogen fluoride catalyst.

The mixture of catalyst and hydrocarbon reaction products passes through line 5 to separation zone 6 which ordinarily comprises a settling zone. The upper hydrocarbon layer containing dissolved hydrogen fluoride is withdrawn through line 7 for further treatment as hereinafter described. The lower used catalyst layer is removed through line 6' and a substantial portion thereof is recycled through line 9 to line 3 and thence into alkylation zone 4. During the course of the reaction the hydrogen fluoride catalyst tends to become contaminated with organic contaminants of a polymer-like nature and also with water. In order to prevent the excessive build-up of these materials, a portion of the used catalyst is directed through line 6' into regeneration zone 8 which may comprise a simple fractional distillation step. During the fractionation the hydrogen fluoride-hydrocarbon complexes are broken down and free hydrogen fluoride and water are distilled overhead. The organic contaminants may be removed through line 10. The hydrogen fluoride-water mixture (which in certain cases may also contain small amounts of dissolved light hydrocarbons) is withdrawn through line 11. A portion of this stream may be directed through lines 12 and 15 to line 9 and thence through line 3 to the alkylation zone. In order to prevent the build-up of water in the catalyst phase at least a portion of the hydrogen fluoride-water stream is passed through line 11 to fractionation zone 13. In this zone substantially anhydrous hydrogen fluoride may be distilled overhead from a bottoms product comprising hydrogen fluoride and water having a higher water content than the charge to the fractionating column. The anhydrous hydrogen fluoride is recovered through line 14 and returned to the alkylation zone through lines 15, 9, and 3.

The hydrogen fluoride-water mixture is removed as a bottoms product from fractionation zone 13 through line 16. This material may conviently comprise the so-called constant boiling mixture which, at atmospheric pressure, will contain from about 35 to about 40 weight per cent of hydrogen fluoride. This aqueous hydrogen fluoride stream is introduced through line 17 into extraction zone 18 wherein it is contacted with the hydrocarbon reaction products introduced by means of line 7. Additional amounts of hydrogen fluoride or water or both may be added to the solvent through line 27. Extraction zone 18 is ordinarily operated under liquid phase conditions at temperatures of from about 50 to about 150° F. and pressures of from about 50 to about 150 pounds per square inch. In certain cases it will be possible to operate outside of these conditions. The extraction zone may comprise any of the well-known forms of contacting apparatus, e. g., a packed reaction zone or a bubble plate column. Under the conditions of operation the free hydrogen fluoride contained in the hydrocarbon stream introduced through line 7 is extracted by the hydrogen fluoride-water mixture. The enriched extract is withdrawn through line 19 and charged through line 11 to the fractionation zone 13 wherein the hydrogen fluoride thus recovered may be separated and returned to the alkylation zone. A hydrocarbon stream which in many cases will be substantially free of dissolved hydrogen fluoride is removed through line 20 to fractionation zone 21.

In zone 21 the hydrocarbon products are fractionated to separate desired reaction products from unconverted reactants and undesired products. Unreacted isobutane is withdrawn through line 22 and is preferably recycled through line 23 to alkylation zone 4. Light gases such as propane are removed through line 26. Alkylation reaction products are withdrawn through line 24 and may be subjected to additional fractionation to separate a product of desired end point. It will usually be desirable also to subject the alkylate to an additional treating step for the removal of combined hydrogen fluoride, e. g., alkyl fluorides which are usually present in relatively small amounts. Normal butane may be removed through line 25.

Although my invention has been described in connection with the removal of dissolved hydrogen fluoride from the total hydrocarbon reaction products prior to fractionation thereof, it will be apparent that the extraction method may be applied to any hydrocarbon stream containing free hydrogen fluoride. For example, the hydrocarbon reaction products in line 7 may be subjected to a deisobutanization step wherein an overhead stream comprising isobutane, hydrogen fluoride, and propane or other light hydrocarbons is separated from a bottoms product comprising alkylation products and unconverted normal butane. This overhead stream of isobutane, propane, and hydrogen fluoride, or any portion thereof, may then be subjected to an extraction step with a hydrogen fluoride-water mixture in the manner hereinbefore described. It will be apparent to those skilled in the art that the fractionation of the hydrocarbon reaction products and the separation and recovery of dissolved hydrogen fluoride may be effected in a variety of ways, dependent upon the fractionation scheme chosen. In general, my invention contemplates the recovery of free hydrogen fluoride from any hydrocarbon stream or streams in the process.

I claim as my invention:

1. A process for the recovery of dissolved hydrogen fluoride from admixture with substantially saturated hydrocarbons which comprises contacting the substantially saturated hydrocarbon mixture in liquid phase with a constant boiling mixture of hydrogen fluoride and water whereby to extract a substantial portion of the dissolved hydrogen fluoride from said hydrocarbon mixture and subjecting the resultant extract to fractionation to separate substantially anhydrous hydrogen fluoride.

2. In the alkylation of isoparaffins with olefins in the presence of a hydrogen fluoride catalyst wherein the bulk of the used catalyst is separated from the hydrocarbon reaction products in a settling zone, the improvement which comprises removing dissolved hydrogen fluoride contained in said hydrocarbon reaction products by subjecting the latter in liquid phase to solvent extraction with a hydrogen fluoride-water mixture containing a major proportion of water.

3. The process of claim 2 wherein the enriched extract from said solvent extraction step is fractionated for the recovery of substantially anhydrous hydrogen fluoride which is returned to the alkylation step.

4. In a process for the alkylation of isoparaffins with olefins in the presence of a hydrogen fluoride catalyst wherein the bulk of the used hydrogen fluoride catalyst is separated from the hydrocarbon reaction products in a settling zone, at least a portion of said used catalyst is subjected to regeneration for the recovery of aqueous hydrogen fluoride, at least a portion of said aqueous hydrogen fluoride is fractionated to separate substantially anhydrous hydrogen fluoride from a constant boiling mixture of hydrogen fluoride and water, and said substantially anhydrous hydrogen fluoride is returned to the alkylation zone, the improvement which comprises contacting said hydrocarbon reaction products in liquid phase with said constant boiling mixture from said fractionation step whereby to extract a substantial amount of dissolved hydrogen fluoride contained in said hydrocarbon reaction products and supplying the resultant hydrogen fluoride enriched extract to said fractionation step.

5. A process for purifying a hydrocarbon liquid containing dissolved hydrogen fluoride which comprises subjecting the hydrocarbon liquid to an extraction treatment with a solution comprising a major proportion of water and a minor proportion of hydrogen fluoride.

6. The process as defined in claim 5 further characterized in that said solution is a constant boiling mixture of water and hydrogen fluoride.

7. A process for purifying a hydrocarbon liquid containing dissolved hydrogen fluoride which comprises subjecting the hydrocarbon liquid to an extraction treatment with a solution of from about 35 to about 40 weight per cent of hydrogen fluoride in water.

LOUIS S. KASSEL.